US009484767B2

(12) United States Patent
Yang et al.

(10) Patent No.: US 9,484,767 B2
(45) Date of Patent: Nov. 1, 2016

(54) BOARD ASSEMBLY AND ELECTRONIC DEVICE INCLUDING THE SAME

(71) Applicant: SAMSUNG ELECTRO-MECHANICS CO., LTD., Suwon (KR)

(72) Inventors: Tae Seok Yang, Suwon (KR); Gun Ah Kim, Suwon (KR); Ted Kim, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 221 days.

(21) Appl. No.: 14/154,898

(22) Filed: Jan. 14, 2014

(65) Prior Publication Data

US 2015/0123603 A1 May 7, 2015

(30) Foreign Application Priority Data

Nov. 4, 2013 (KR) .................. 10-2013-0133158

(51) Int. Cl.
*H02J 7/00* (2006.01)
*H02J 7/04* (2006.01)
*H02J 7/02* (2016.01)
*H02J 5/00* (2016.01)
*H01M 10/42* (2006.01)

(52) U.S. Cl.
CPC .............. *H02J 7/025* (2013.01); *H02J 7/0042* (2013.01); *H01M 10/425* (2013.01); *H02J 5/005* (2013.01); *H02J 7/0044* (2013.01); *H02J 7/0052* (2013.01)

(58) Field of Classification Search
USPC ........ 320/107, 108, 104, 114, 103, 134, 118, 320/137, 106, 119
See application file for complete search history.

(56) References Cited

U.S. PATENT DOCUMENTS

| 2008/0094032 | A1* | 4/2008 | Miyamoto | H02J 7/0031 320/134 |
| 2009/0322277 | A1* | 12/2009 | Cargin, Jr. | G06F 1/1613 320/106 |
| 2011/0050164 | A1* | 3/2011 | Partovi | H01F 5/003 320/108 |
| 2011/0241607 | A1* | 10/2011 | Wiegers | H02J 7/025 320/108 |
| 2011/0285348 | A1* | 11/2011 | Hong | H02J 7/025 320/108 |
| 2012/0187903 | A1* | 7/2012 | Tabata | H02J 7/025 320/108 |
| 2012/0286742 | A1 | 11/2012 | Ichikawa et al. | |
| 2013/0082649 | A1 | 4/2013 | Lee et al. | |

(Continued)

FOREIGN PATENT DOCUMENTS

CN 101183738 A 5/2008
EP 1 914 860 A2 4/2008

(Continued)

OTHER PUBLICATIONS

Korean Office Action issued on Aug. 21, 2014 in corresponding Korean Patent Application No. 10-2013-0133158.

Chinese Office Action issued on May 3, 2016 in counterpart Chinese Application No. 201410046254.7 (18 pages in Chinese with English translation).

*Primary Examiner* — Alexis A Boateng
(74) *Attorney, Agent, or Firm* — NSIP Law (57) ABSTRACT

There is provided a wireless power transmitter, including: a board having circuit wiring thereon; a connector mounted on a surface of the board; a terminal pin formed on one side of the connector and penetrating through the board; and a battery provided on the other surface of the board to be coupled to the terminal pin.

10 Claims, 7 Drawing Sheets

(56) References Cited

U.S. PATENT DOCUMENTS

| | | | | |
|---|---|---|---|---|
| 2013/0278207 | A1* | 10/2013 | Yoo | H02J 7/025 320/108 |
| 2013/0300204 | A1* | 11/2013 | Partovi | H01F 38/14 307/104 |
| 2013/0314880 | A1* | 11/2013 | Sun | H02J 7/0044 361/730 |
| 2014/0055078 | A1* | 2/2014 | Jing | H02J 7/0044 320/103 |
| 2014/0111147 | A1* | 4/2014 | Soar | H01F 27/365 320/108 |
| 2014/0191713 | A1* | 7/2014 | Hong | H02J 7/0029 320/108 |
| 2015/0171649 | A1* | 6/2015 | Kim | H02J 7/0044 320/114 |

FOREIGN PATENT DOCUMENTS

| | | |
|---|---|---|
| JP | 2011-243841 | 12/2011 |
| KR | 20-2009-0002296 | 3/2009 |
| KR | 10-1014992 | 2/2011 |
| KR | 10-1198881 | 11/2012 |
| KR | 10-2013-0035725 | 4/2013 |
| KR | 10-2013-0118413 | 10/2013 |
| WO | WO 2011/093438 A1 | 8/2011 |

* cited by examiner

BOARD ASSEMBLY AND ELECTRONIC DEVICE INCLUDING THE SAME

CROSS-REFERENCE TO RELATED APPLICATION

This application claims the benefit of Korean Patent Application No. 10-2013-0133158 filed on Nov. 4, 2013, with the Korean Intellectual Property Office, the disclosure of which is incorporated herein by reference.

BACKGROUND

The present disclosure relates to a board assembly and an electronic device including the same.

Generally, a portable electronic device such as a mobile communications terminal or a personal digital assistant (PDA) is provided with a rechargeable (secondary cell) battery as a battery.

In order to charge such a battery using domestic electricity, a separate charging device is required to provide electrical energy to the battery of the portable electronic device.

Typically, a charging device and a battery include dedicated contact terminals formed on the exteriors thereof, such that the charging device and the battery can be electrically connected to each other by bringing the contact terminals into contact with one another.

Since contact terminals protrude externally, however, such contact terminals may mar product appearance and may be contaminated with foreign materials, such that contact therebetween easily may be degraded.

In addition, if a battery is short-circuited or exposed to moisture due to a user's inadvertence, charged energy may be easily lost.

As an alternative to the above-mentioned contact type charging scheme, a contactless charging scheme has been proposed, in which a battery is charged in a such manner that power is wirelessly transmitted without bringing the contact terminals of the charging device and the battery into contact with one another.

In general, a wireless charging scheme refers to a scheme in which power is transmitted wirelessly to a portable electronic device having a battery therein using a wireless charging device.

Such a wireless charging device and a portable electronic device transmit and receive power using electromagnetic induction.

Current technological trends are for smaller and thinner wireless charging devices. However, a wireless power transmitter in an existing wireless charging device has electronic components and a battery mounted on the same surface of the board, so that a large area is required on the board.

SUMMARY

An aspect of the present disclosure may provide a board assembly which reduces the area of a board by providing a battery below the board.

An aspect of the present disclosure may also provide a board assembly including a connector having a terminal pin penetrating through the board, and a battery coupled to the terminal pin.

According to an aspect of the present disclosure, a board assembly may include: a board having circuit wiring thereon; a connector mounted on a surface of the board; a terminal pin formed on one side of the connector and penetrating through the board; and a battery provided on the other surface of the board to be coupled to the terminal pin.

A plurality of the terminal pin may be provided.

One end of the terminal pin coupled to the battery may be bent.

The terminal pin may have a dummy portion at one end thereof.

The battery and the board may be coupled to each other by an adhesive.

The connector may have a connection terminal portion electrically connected to the board on one side thereof.

The connection terminal portion may be coupled to the board by soldering.

The board may include a coil pattern part.

According to another aspect of the present disclosure, an electronic device may include: upper and lower housings forming an inner space; a board disposed in the inner space and including circuit wiring; a connector having a terminal pin penetrating through the board and mounted on a surface of the board; and a battery provided on the other surface of the board and coupled to the terminal pin.

The electronic device may further include a middle cover accommodating the board therein.

The board and the middle cover may be coupled to each other with a screw.

The board may include a coil pattern part.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Although a board assembly according to exemplary embodiments of the present disclosure is applied to a wireless power transmitter in the following description, it is to be noted that the board assembly may be applied to various electronic devices having boards therein.

Figure 1:
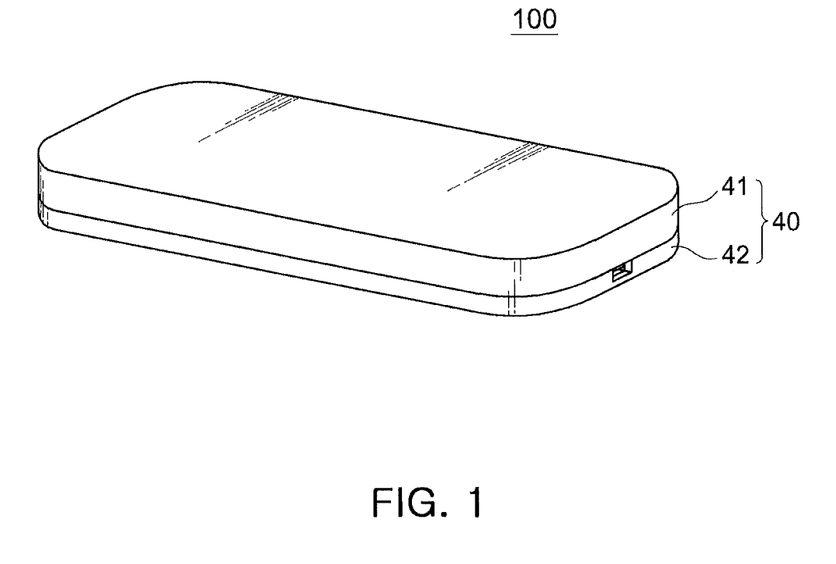
FIG. 1 is a perspective view of a wireless power transmitter according to an exemplary embodiment of the present disclosure.
Figure 2:
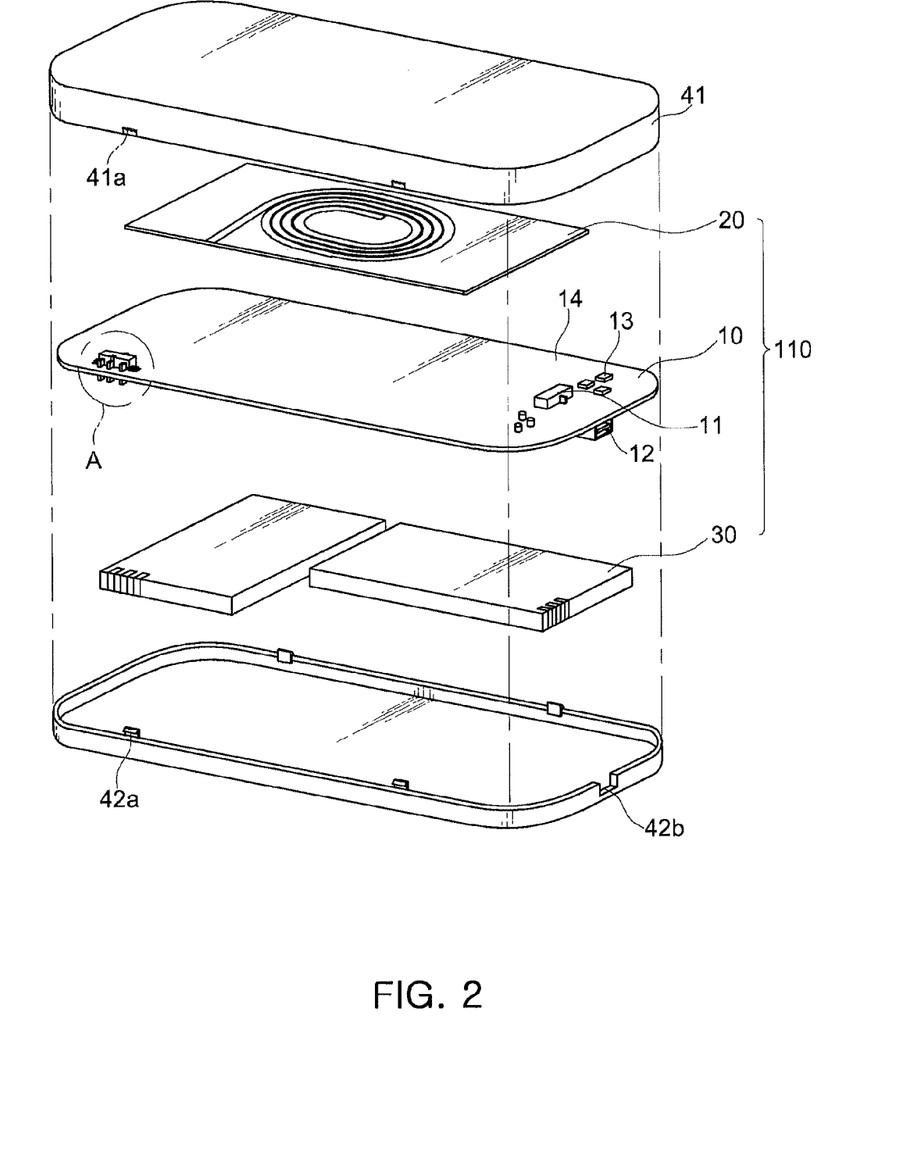
FIG. 2 is an exploded perspective view of the wireless power transmitter shown in FIG. 1.

FIG. 1 is a perspective view of a wireless power transmitter according to an exemplary embodiment of the present disclosure; and FIG. 2 is an exploded perspective view of the wireless power transmitter shown in FIG. 1. In addition, FIGS. 3A and 3B are partially enlarged views of portion A of FIG. 2.

Figure 3A:
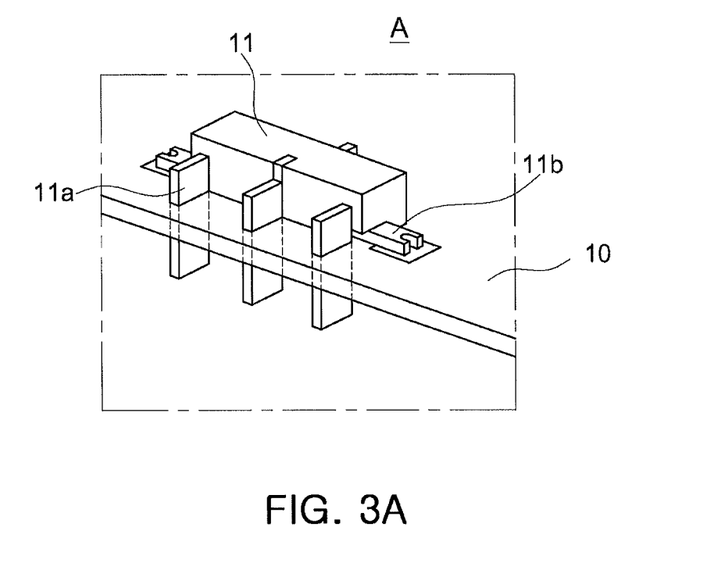
FIG. 3A is an enlarged view of portion A of FIG. 2.
Figure 3B:
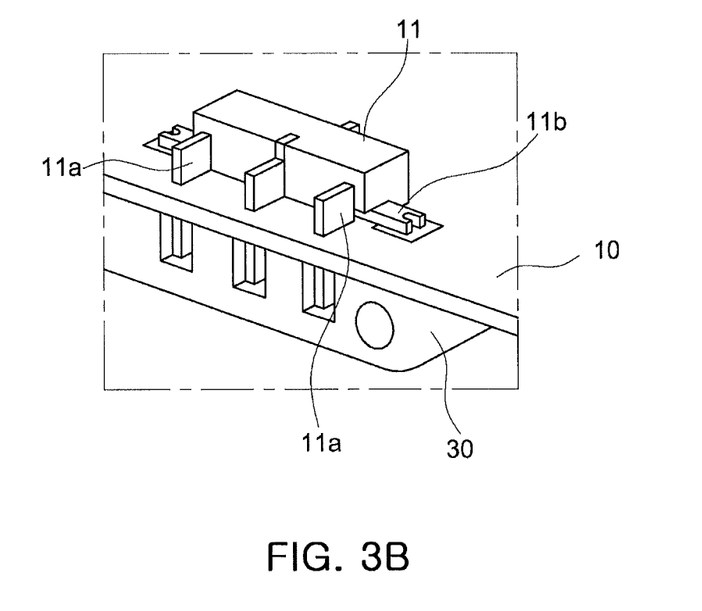
FIG. 3B is an enlarged view of portion A of FIG. 2 with a battery coupled therewith.

Referring to FIGS. 1 through 3, the wireless power transmitter according to an exemplary embodiment of the present disclosure may include a board assembly 110 and a housing 40.

Specifically, the wireless power transmitter according to the exemplary embodiment may include the housing 40 including upper and lower covers 41 and 42 coupled to each other to form an inner space, and the board assembly 110 provided in the inner space of the housing 40.

In an exemplary embodiment of the present disclosure, the board assembly 110 may include a board 10, a coil pattern part 20, and a battery 30.

The board 10 may include circuit wiring 14, a connector 11, a power input unit 12, and the like.

The board 10 may be an insulation substrate having rigidity, such as a printed circuit board (PCB), a ceramic substrate, a pre-molded substrate or a direct bonded copper (DBC) substrate, or may be an insulated metal substrate (IMS).

However, the present disclosure is not limited thereto but a flexible PCB which is thin and has a wiring pattern formed thereon, such as a film or a thin printed circuit board, may be used as the board 10 as necessary.

Further, the board 10 may have at least one electronic component 13 mounted thereon, and may have electrodes for mounting (not shown) formed thereon, and a ground electrode and circuit wiring 14 formed thereon for electrically connecting the electrodes for the mounting thereof.

In addition to the electrodes for mounting and the circuit wiring 14, the board 10 may include conductive vias (not shown) for electrical connections and may have a cavity in which an electronic component is accommodated.

Here, the board 10 according to an exemplary embodiment of the present disclosure may have the coil pattern part 20 generating an induced magnetic field and the electronic component 13 mounted thereon.

The coil pattern part 20 may be provided as a patterned metal layer including a coil pattern on one surface of the board 10. That is, the coil pattern part 20 may include a metal layer and a coil pattern formed on one surface of the metal layer by a patterning process and may be mounted on one surface of the board 10.

Although not shown in the drawings, the coil pattern part 20 may not include a separate metal layer but be a coil pattern directly formed on one surface of the board 10.

Further, although not shown in the drawings, the coil pattern part 20 may be a wiring pattern directly formed on one surface of the board 10 and may have a number of layers.

Further, the coil pattern part 20 may be formed by embedding a wound coil in the board 10.

The coil pattern part 20 may be provided in a circular spiral shape on one surface of the board 10.

Although the coil pattern part 20 is formed in a generally circular spiral shape in the drawings by way of example, the shape of the coil pattern part 20 is not limited thereto but may be variously formed, such as a polygonal spiral shape.

The board 10 may have the circuit wiring 14 formed thereon and the electronic component 13 mounted thereon. Like the coil pattern part 20, the circuit wiring 14 may also be formed by a patterning process.

The board 10 may be provided with both of the coil pattern part 20 and the circuit wiring 14, and the coil pattern part 20 and the circuit wiring 14 may be provided on different layers.

That is, the coil pattern part 20 may be formed on one surface of the board 10 by a patterning process and the circuit wiring 14 may be formed on the other surface of the board 10 by a patterning process.

Further, the power input unit 12 may be provided at one end of the board 10. The power input unit 12 may be connected to an external power source so as to supply power to the battery 30 and may be a universal serial bus (USB) terminal.

However, the power input unit 12 is not limited to a USB terminal but may include a variety of power input units that are connected to an external power source so as to supply power to the battery 30.

That is, because the wireless power transmitter 100 according to an exemplary embodiment of the present disclosure may charge the battery 30 therein using power from an external power source, the wireless power transmitter 100 may wirelessly transmit power to an electronic device even when it is not connected to the external power source by using the power stored in the battery 30, as well as when it is connected to the external power source.

Referring to FIG. 3A, the connector 11 may include a terminal pin 11a and a connection terminal portion 11b.

Further, referring to FIG. 3B, the battery 30 may be located at the opposite side of the board to the side where the connector 11 is mounted.

The connector 11 may electrically connect the battery 30 and electronic components in the wireless power transmitter 100.

Further, those skilled in the art would conceive a board having a single connector or a plurality of connectors as the necessity requires, which also fall within the scope of the present disclosure.

The connector 11 may be disposed on one surface of the board 10 and may be soldered onto the board 10 by the connection terminal portion 11b provided at one end of the connector 11.

Further, the connection terminal portion 11b may be provided at one end of the connector 11 in parallel to one surface of the board 10.

Accordingly, the connection terminal portion 11b may be easily soldered onto the board 10.

In addition, on one side of the connector 11, the terminal pin 11a for electrically connecting the connector 11 to the battery 30 may be provided.

One end of the terminal pin 11a may be in contact with the connector 11 while the other end thereof may penetrate through the board 10 to be connected to the battery 30.

Accordingly, even if the connector 11 and the battery 30 are located on different surfaces of the board 10, they may be electrically connected by the terminal pin 11a penetrating through the board 10.

That is, by virtue of the terminal pin 11a penetrating through the board 10, the connector 11 and the battery 30 may be located on different surfaces of the board 10, and thus sufficient space for mounting an electronic component 13 may be ensured on one surface of the board 10 on which the connector 11 is located.

As a result, the size of the board 10 may be reduced and thus the wireless power transmitter may be thinner and smaller.

Figure 4A:
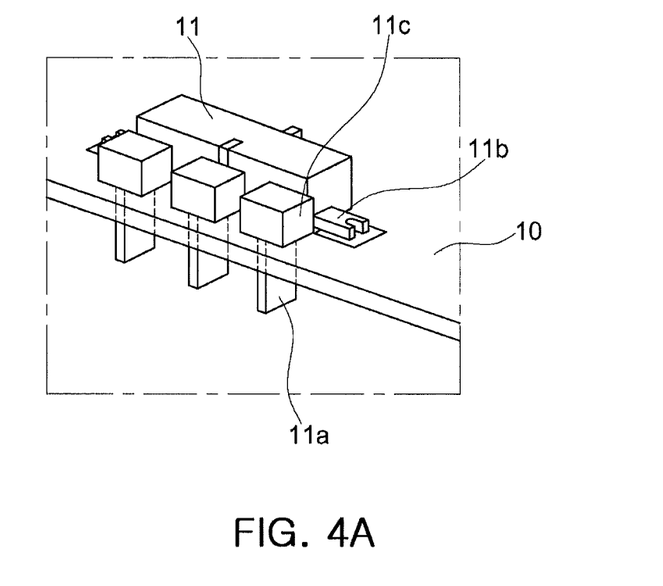
FIG. 4A is an enlarged view of portion A according to another exemplary embodiment of the present disclosure.
Figure 4B:
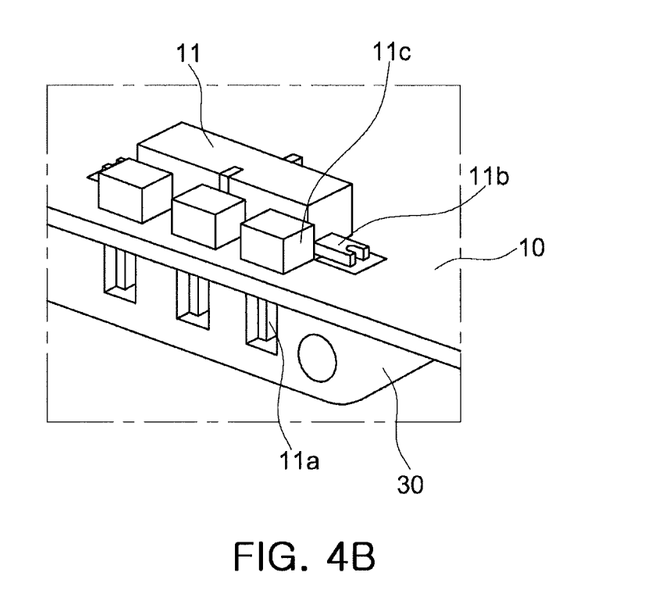
FIG. 4B is an enlarged view of portion A according to another exemplary embodiment of the present disclosure with a battery coupled therewith.

If necessary, a plurality of the terminal pins 11a may be provided. Further, a dummy portion (indicated by 11c in FIG. 4) may be provided at one end of the terminal pin.

An adhesive may be applied to one surface of the dummy portion 11c in contact with the board 10, such that it may be bonded to the board 10.

Accordingly, the connector 11 may be more securely fixed to the board 10.

Figure 5A:
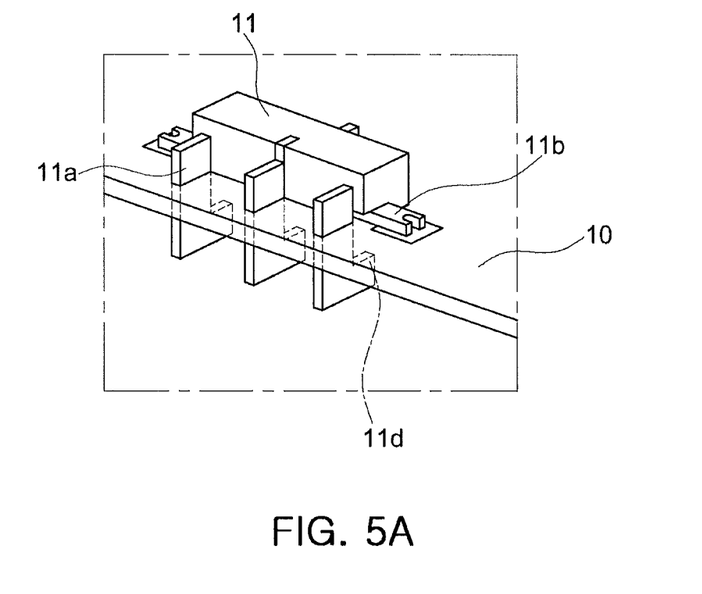
FIG. 5A is an enlarged view of portion A according to another exemplary embodiment of the present disclosure.
Figure 5B:
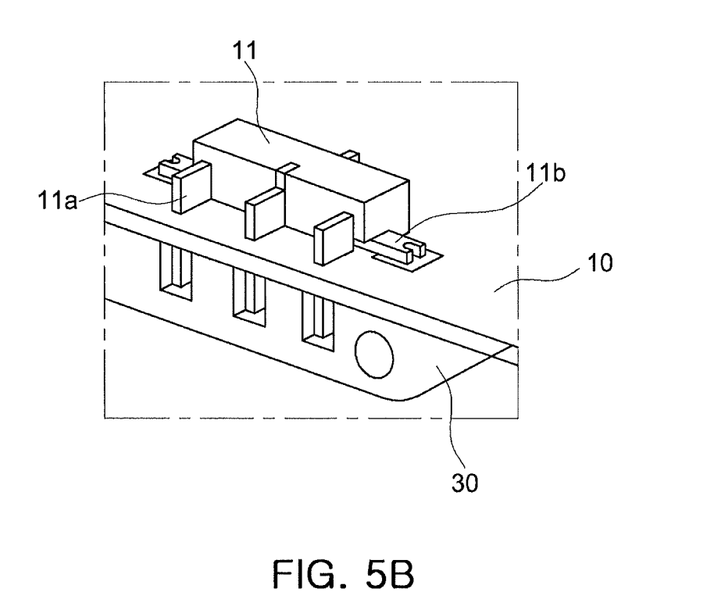
FIG. 5B is an enlarged view of portion A according to another exemplary embodiment of the present disclosure with a battery coupled therewith.

Further, a bent portion (indicated by 11d in FIG. 5) may be provided at one end of the terminal pin 11a. Specifically, the terminal pin 11a may be securely fixed to the board 10 by the bent portion 11d, such that it may be possible to prevent the terminal pin 11a from being displaced from where it is due to external impacts.

It is to be noted that the shape of the terminal pin 11a may vary as required and which also falls within the scope of the present disclosure.

The battery 30 may be located on the opposite side of the board 10 to the side where the connector 11 is located.

That is, the battery 30 may be located on the opposite side of the board 10 to the side thereof on which the connector 11 is located and may be connected to the terminal pin 11a.

If necessary, a plurality of the batteries 30 may be provided. Further, the battery 30 may be connected to the power input unit 12 to be charged by an external power source.

By virtue of the battery 30, the wireless power transmitter according to an exemplary embodiment of the present disclosure may transmit power to an electronic device even when it is not connected to an external power source.

The battery 30 may be bonded or screwed to the opposite side of the board 10. The battery 30 may be located in the housing 40, more specifically in the cover on the side where the battery 30 is located (the lower cover 42 in the drawings). That is, the battery 30 may be bonded or screw to the housing 40 or may be fixed to the housing 40 by other means.

The housing 40 may include the upper cover 41 and the lower cover 42.

The upper cover 41 may have a first coupling groove 41a so as to be coupled to the lower cover 42.

The lower cover 42 may have a first groove portion 42b on one side thereof so as to expose the power input unit 12 to the outside.

Further, the lower cover 42 may have a first coupling projection 42a so as to be coupled to the upper cover 41. Here, the location of the first coupling projection 42a corresponds to the location of the first coupling groove 41a.

It is to be noted that the coupling method of the upper cover 41 and the lower cover 42 is not limited to the coupling method described above, but may include various methods such as bonding coupling or screw coupling.

The upper cover 41 and the lower cover 42 are coupled to each other so as to form the housing 40 including the inner space, in which the board assembly 110 is provided.

Figure 6:
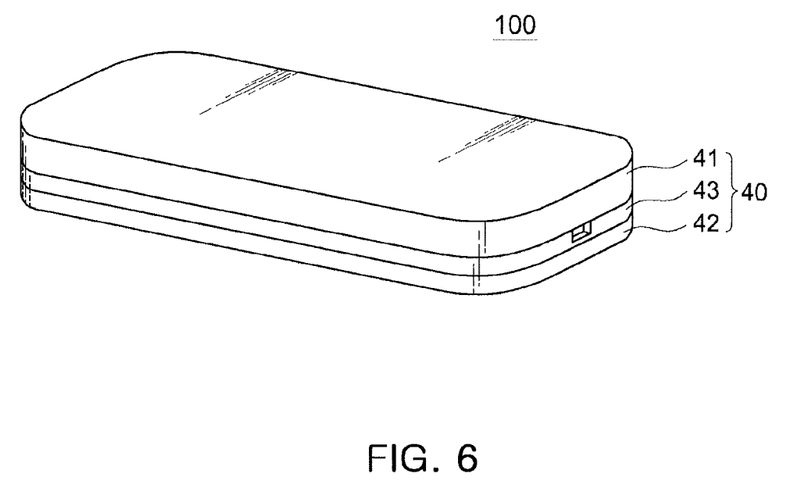
FIG. 6 is a perspective view of a wireless power transmitter according to an exemplary embodiment of the present disclosure.
Figure 7:
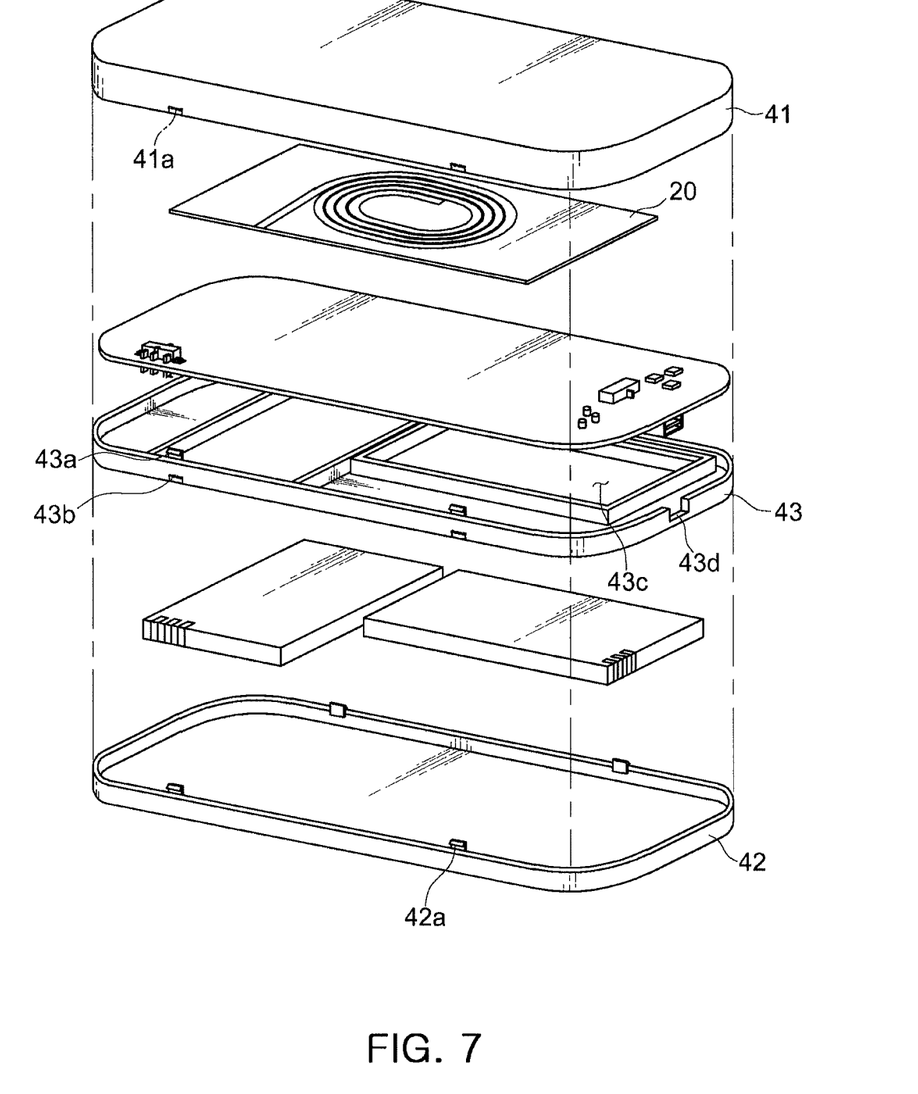
FIG. 7 is an exploded perspective view of the wireless power transmitter shown in FIG. 6.

FIG. 6 is a perspective view of a wireless power transmitter according to another exemplary embodiment of the present disclosure; and FIG. 7 is an exploded perspective view of the wireless power transmitter shown in FIG. 6.

Referring to FIGS. 6 and 7, the wireless power transmitter 100 according to another exemplary embodiment of the present disclosure may include a board assembly 110 and a housing 40.

That is, the wireless power transmitter according to another exemplary embodiment of the present disclosure has the same configuration as that of the wireless power transmitter according to the previous exemplary embodiment shown in FIGS. 1 through 3, except for the housing 40.

Therefore, detail descriptions on the same components will be omitted.

In another exemplary embodiment of the present disclosure, the housing may include an upper cover 41, a lower cover 42, and a middle cover 43.

The middle cover 43 may be coupled to the lower portion of the upper cover 41 and with the upper portion of the lower cover 42.

A second coupling projection 43a for coupling with the upper cover 41 may be provided on the upper portion of the middle cover 43, and a second coupling groove 43b for coupling with the lower cover 42 may be provided on the lower portion of the middle cover 43.

In accordance with the second coupling projection 43a and the second coupling groove 43b, a first coupling groove 41a and a first coupling projection 42a may be provided to the upper cover 41 and lower cover 42, respectively.

The coupling method of the upper cover 41, the middle cover 43, and the lower cover 42 is not limited to the coupling method described above, but may include various methods such as bonding coupling or screw coupling.

The middle cover 43 may include an inner space 43c in which a battery 30 is accommodated. The shape and the number of the inner space(s) 43c provided in the middle cover 43 may be the same as those of the battery (or batteries) 30.

In addition, a board 10 may be disposed on a surface of the middle cover 43, such that they may be coupled using a screw coupling or a bonding coupling.

Further, the middle cover 43 may have a groove portion 43d so as to expose a power input unit 12 to the outside.

By virtue of the middle cover 43, the board 10 and the battery 30 are not separated but securely coupled to each other even if external impact is imparted.

As set forth above, according to exemplary embodiments of the present disclosure, in a board assembly, a connector is mounted on one surface of a board and has a terminal pin penetrating through the board, and a battery is coupled to the terminal pin from the other surface of the board, so that electronic components and the battery are located on different surfaces of the board, thereby reducing the size of the board.

While exemplary embodiments have been shown and described above, it will be apparent to those skilled in the art that modifications and variations could be made without departing from the spirit and scope of the present disclosure as defined by the appended claims.

What is claimed is:

1. A board assembly applied to a wireless power transmitter, comprising:
    a board having circuit wiring disposed thereon;
    at least one electronic component mounted on one surface of the board;
    a connector mounted on the one surface of the board and electrically connected to the at least one electronic component;
    a terminal pin formed on one side of the connector and penetrating through the board; and a battery provided on the other surface of the board to be coupled to the terminal pin, and electrically connected to the at least one electronic component by the connector and the terminal pin, wherein the board includes a coil pattern part generating a magnetic field, and the battery is located on the opposite side of the board to the side on which the coil pattern part is formed.

2. The board assembly of claim 1, wherein a plurality of the terminal pin is provided.

3. The board assembly of claim 1, wherein one end of the terminal pin coupled to the battery is bent.

4. The board assembly of claim 1, wherein the terminal pin has a dummy portion at one end thereof.

5. The board assembly of claim 1, wherein the battery and the board are coupled to each other by an adhesive.

6. The board assembly of claim 1, wherein the connector has a connection terminal portion electrically connected to the board on one side thereof.

7. The board assembly of claim 6, wherein the connection terminal portion is coupled to the board by soldering.

8. An electronic device applied to a wireless power transmitter, comprising:
 upper and lower housings forming an inner space;
 a board disposed in the inner space and including circuit wiring;
 at least one electronic component mounted on one surface of the board;
 a connector having a terminal pin penetrating through the board, wherein the connector is mounted on the one surface of the board and is electrically connected to the at least one electronic component; and
 a battery provided on the other surface of the board and coupled to the terminal pin, and electrically connected to the at least one electronic component by the connector,
 wherein the board includes a coil pattern part generating an induced magnetic field, and
 the battery is located on the opposite side of the board to the side on which the coil pattern part is formed.

9. The electronic device of claim 8, further comprising a middle cover accommodating the board therein.

10. The electronic device of claim 9, wherein the board and the middle cover are coupled to each other with a screw.

* * * * *